US012391481B2

(12) United States Patent
Yu et al.

(10) Patent No.: US 12,391,481 B2
(45) Date of Patent: Aug. 19, 2025

(54) LARGE DEFORMATION UNDERGROUND ENERGY STORAGE DEVICE

(71) Applicant: CHINA UNIVERSITY OF MINING AND TECHNOLOGY, Jiangsu (CN)

(72) Inventors: Liyuan Yu, Jiangsu (CN); Bowen Hu, Jiangsu (CN); Rui Sun, Jiangsu (CN); Xianzhen Mi, Jiangsu (CN); Shuchen Li, Jiangsu (CN); Haijian Su, Jiangsu (CN); Wei Li, Jiangsu (CN); Chao Wei, Jiangsu (CN); Tao Zhang, Jiangsu (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 165 days.

(21) Appl. No.: 18/506,403

(22) Filed: Nov. 10, 2023

(65) Prior Publication Data

US 2025/0058973 A1 Feb. 20, 2025

(30) Foreign Application Priority Data

Aug. 14, 2023 (CN) .......................... 202311015175.5

(51) Int. Cl.
*B65G 5/00* (2006.01)
*F17C 1/02* (2006.01)

(52) U.S. Cl.
CPC ................ *B65G 5/005* (2013.01); *F17C 1/02* (2013.01)

(58) Field of Classification Search
CPC .......... B65G 5/00; B65G 5/005; B65D 88/76; F17C 1/02; F17C 2203/0604; F17C 2203/0634; F17C 2203/068
See application file for complete search history.

(56) References Cited

U.S. PATENT DOCUMENTS 5,292,027 A * 3/1994 Lueke ................... F22B 37/365
52/630

FOREIGN PATENT DOCUMENTS

| CN | 213235081 | * | 5/2021 | |
|----|-----------|---|--------|---|
| CN | 116335757 | * | 6/2023 | |
| CN | 117231232 | * | 12/2023 | |
| CN | 117307210 | * | 12/2023 | |
| GB | 1574367 A | * | 9/1980 | ............. B65D 88/76 |
| JP | H08312298 | * | 11/1996 | |

* cited by examiner

*Primary Examiner* — Carib A Oquendo
(74) *Attorney, Agent, or Firm* — Piloff Passino & Cosenza LLP; Rachel K. Piloff; Sean A. Passino

(57) ABSTRACT

The disclosure belongs to the field of underground energy storage, and particularly provides a large-deformation underground energy storage device, including a body. The body includes a rubber sealing layer, a negative Poisson's ratio material layer, a large deformation concrete layer and rock layers sequentially nested from inside to outside; an internal storage space is formed in the rubber sealing layer, the negative Poisson's ratio material layer includes a plurality of negative Poisson's ratio material elements connected in sequence, and the large deformation concrete layer is cast from deformable concrete.

10 Claims, 6 Drawing Sheets

LARGE DEFORMATION UNDERGROUND ENERGY STORAGE DEVICE

CROSS-REFERENCE TO RELATED APPLICATIONS

This disclosure claims priority to Chinese Patent Application No. 202311015175.5, filed on Aug. 14, 2023, the contents of which are hereby incorporated by reference.

TECHNICAL FIELD

The disclosure belongs to the field of underground energy storage, and in particular to a large deformation underground energy storage device.

BACKGROUND

With an increasing global demand for renewable energy, underground energy storage, as a reliable scheme for large-scale energy storage, is attracting extensive attention. Taking compressed air energy storage and compressed hydrogen energy storage as examples, compressed air energy storage has a large-scale energy storage capacity. Compared with conventional coal-fired power plants, compressed air energy storage has a less impact on environments and may not produce any pollution gas emissions. The compressed hydrogen energy storage may store a large amount of energy through a small volume of hydrogen, and hydrogen may be stored in large quantities for a long time under a condition that hydrogen embrittlement effect will not destroy seal.

However, they both need to compress gas and store the gas in an underground gas storage during operation. A following problem is that with an increasing pressure during gas compression, the gas storage will be deformed, and in serious cases, a seal failure may occur. The seal failure will seriously affect an energy conversion efficiency of underground energy storage, and in serious cases, it will also endanger surrounding environments and personal safety.

Therefore, the disclosure intends to propose a large deformation underground energy storage device with an autonomous water seal function to overcome the above difficulties.

SUMMARY

In order to solve the above technical problems, the disclosure provides a large deformation underground energy storage device, aiming at solving or improving at least one of the above technical problems.

In order to achieve the above objective, the disclosure provides a large deformation underground energy storage device, including a body, and the body includes a rubber sealing layer, a negative Poisson's ratio material layer, a large deformation concrete layer and rock layers sequentially nested from inside to outside. An internal storage space is formed in the rubber sealing layer. The negative Poisson's ratio material layer includes multiple negative Poisson's ratio material elements connected in sequence, and the large deformation concrete layer is formed by pouring deformable concrete.

Based on the above structure, the large deformation underground energy storage device has following technical effects. In the device, the rubber sealing layer, the negative Poisson's ratio material layer, the large deformation concrete layer and the rock layers are nested step by step to form a basic part, and this part may undergo large deformation when stressed, thus weakening a pressure of internal gas, and further storing more gas. The device may help solve a challenge of energy storage, realize efficient utilization and sustainable development of energy, and promote a wide application of renewable energy.

In an embodiment, the rock layers include a primary rock layer connected with the large deformation concrete layer and a secondary rock layer located outside the primary rock layer, and the primary rock layer and the secondary rock layer are paved with rock materials with different sizes to improve an effect of absorbing a radial stress.

In an embodiment, an annular conduit is nested between the primary rock layer and the secondary rock layer, and the annular conduit is communicated into the rubber sealing layer through the conduit, and a one-way pressure pump is arranged in a middle part of the conduit. The conduit penetrates into an interior of the body for discharging accumulated water in the body, and is connected with the one-way pressure pump, and the one-way pressure pump has a characteristic of one-way conduction.

In an embodiment, the one-way pressure pump includes a one-way pressure pump housing, and a one-way pressure pump cavity is formed in the one-way pressure pump housing. One end of the one-way pressure pump cavity is connected with the conduit, and an other end is connected with the annular conduit. A first one-way valve is arranged at a position of the one-way pressure pump cavity being connected with the conduit, and a second one-way valve is arranged on one side of a position of the one-way pressure pump cavity being connected with the annular conduit, and a piston rubber body is movably connected in the one-way pressure pump cavity.

In an embodiment, the piston rubber body is connected with a precession screw through a threaded rod.

In the above structure, the precession screw rotates to drive the threaded rod and the piston rubber body to reciprocate along a length direction of the threaded rod, so as to realize actions of pumping negative pressure and pressurizing the one-way pressure pump cavity, and then the accumulated water in the body is pumped through the first one-way valve in a process of pumping negative pressure, and the accumulated water in the one-way pressure pump cavity is discharged to the annular conduit through the second one-way valve in a process of pressurizing.

In an embodiment, the rubber sealing layer further includes a water depth gauge, and the water depth gauge includes a water depth gauge housing and a water depth gauge cavity. A signal antenna is fixed inside the water depth gauge cavity, and both ends the signal antenna are respectively connected to an inner surface and an outer surface of the water depth gauge housing through wires, and the water depth gauge housing is made of a piezoelectric material. In this structure, the water depth gauge housing is made of a special material, such as the piezoelectric material, which may generate electrons that move freely when subjected to a pressure, thereby forming a potential difference under the pressure. A current flows from the inner surface of the water depth gauge housing along the wires to the signal antenna, and then to the outer surface of the water depth gauge housing.

In an embodiment, both sides of the water depth gauge housing are oval, and an external dimension of one side is larger than an other side. When there is more accumulated water in the body, the water depth gauge will float under buoyancy, and a larger side is above the water and a smaller side is under the water. The signal antenna is in signal connection with the precession screw. The signal antenna does not emit signals when it is horizontal or has a small angle with a horizontal plane, but only emits signals when it is vertical or inclined.

In an embodiment, multiple rigid gaskets for supporting the annular conduit are arranged in the primary rock layer, and the multiple rigid gaskets are distributed along an inner circumferential direction of the annular conduit for supporting the annular conduit from the inside.

In an embodiment, a length of one side of each of the rigid gaskets close to the annular conduit is longer than a length of one side close to the large deformation concrete layer. The length of one side of each of the rigid gaskets close to the annular conduit is longer than an other side, which is beneficial to better supporting the annular conduit.

In an embodiment, multiple three-way nozzle instruments are distributed along a peripheral side of the annular conduit. Each of the three-way nozzle instruments includes a pressure switch and three bifurcated nozzles, and the nozzles are used for uniformly discharging the accumulated water in the annular conduit into the secondary rock layer.

BRIEF DESCRIPTION OF THE DRAWINGS

In order to explain technical schemes of embodiments of the disclosure or technical schemes in the prior art more clearly, drawings needed in embodiments or the prior art are briefly introduced below. Apparently, the drawings in a following description are only some embodiments of the disclosure. For ordinary people in the field, other drawings may be obtained according to these drawings without making creative efforts.

DETAILED DESCRIPTION OF THE EMBODIMENTS

In the following, technical schemes in embodiments of the disclosure may be clearly and completely described with reference to attached drawings. Apparently, the described embodiments are only a part of the embodiments of the disclosure, but not all embodiments. Based on the embodiments in the disclosure, all other embodiments obtained by ordinary technicians in the field without making creative efforts belong to a scope of protection of the disclosure.

In order to make above objects, features and advantages of the disclosure more obvious and easier to understand, the disclosure may be further described in detail with the attached drawings and specific embodiments.

A large deformation underground energy storage device according to the disclosure will be described with reference to FIGS. 1 to 6.

Figure 1:
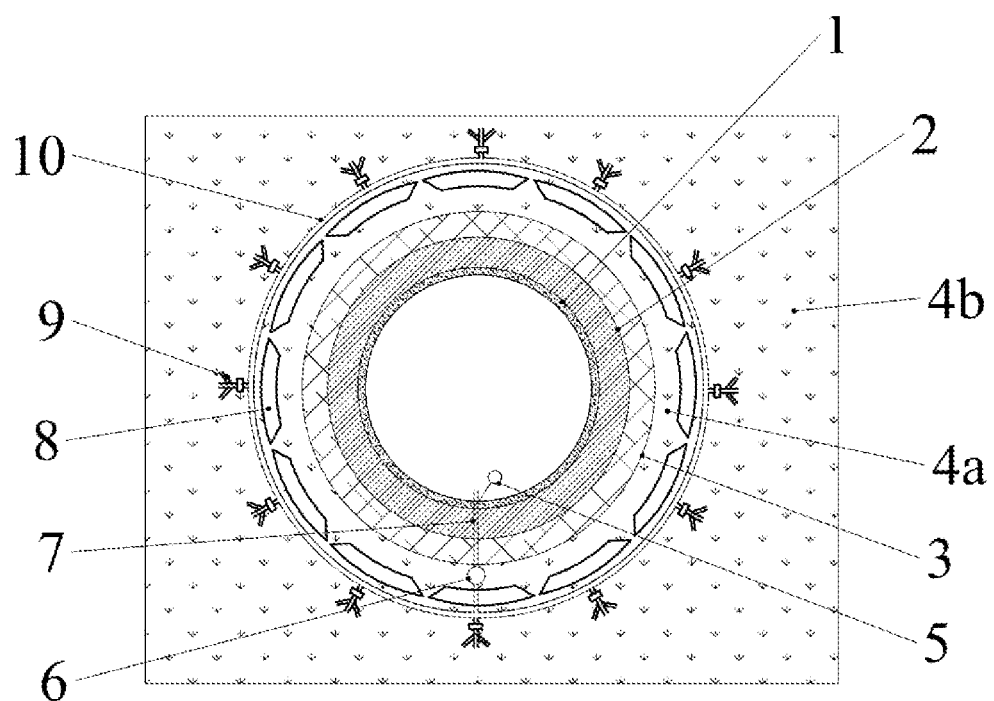
FIG. 1 is a schematic structural diagram of a large deformation underground energy storage device according to an embodiment of the disclosure.
Figure 2:
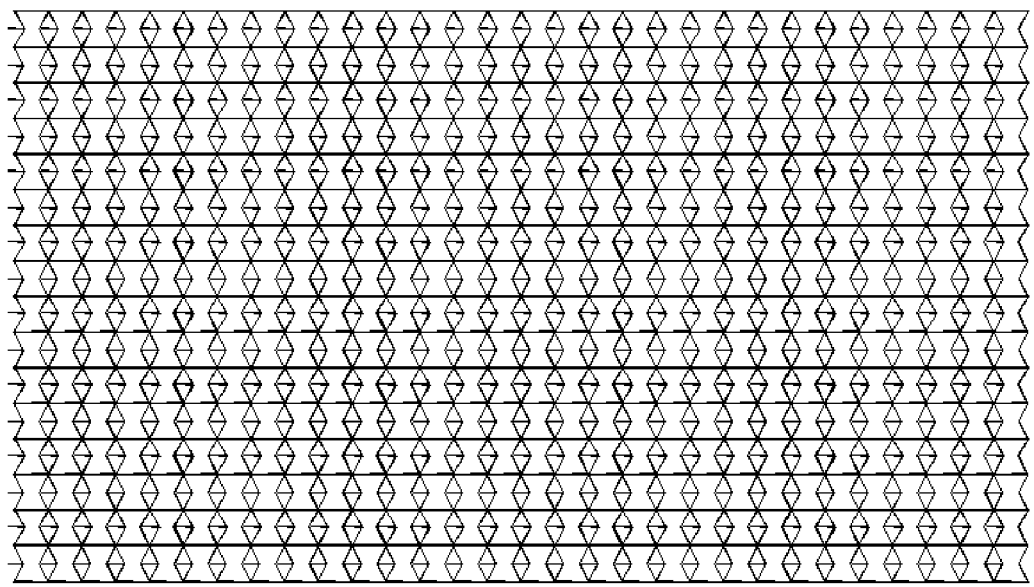
FIG. 2 is a schematic diagram of a negative Poisson's ratio material layer in a large deformation underground energy storage device according to an embodiment of the disclosure.
Figure 3:
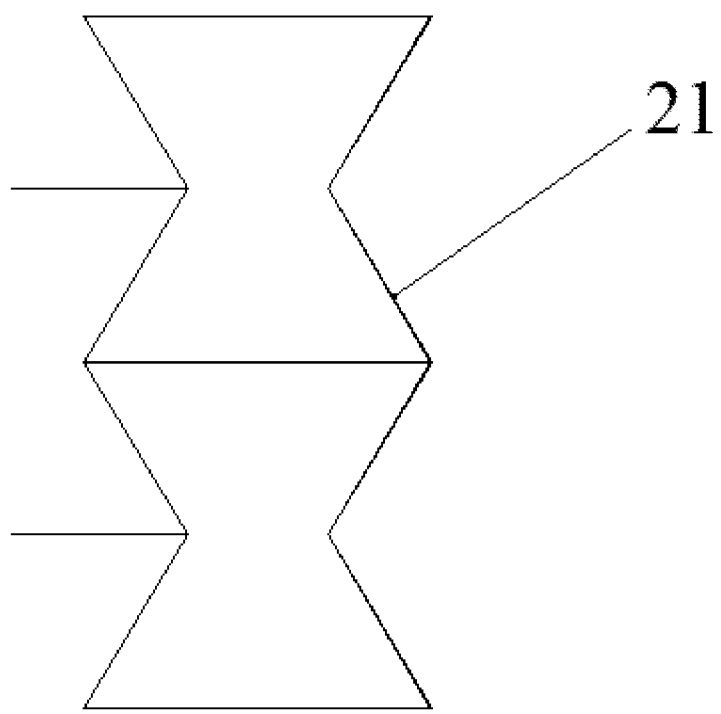
FIG. 3 is a schematic diagram of a negative Poisson's ratio material element in a large deformation underground energy storage device according to an embodiment of the disclosure.
Figure 4:
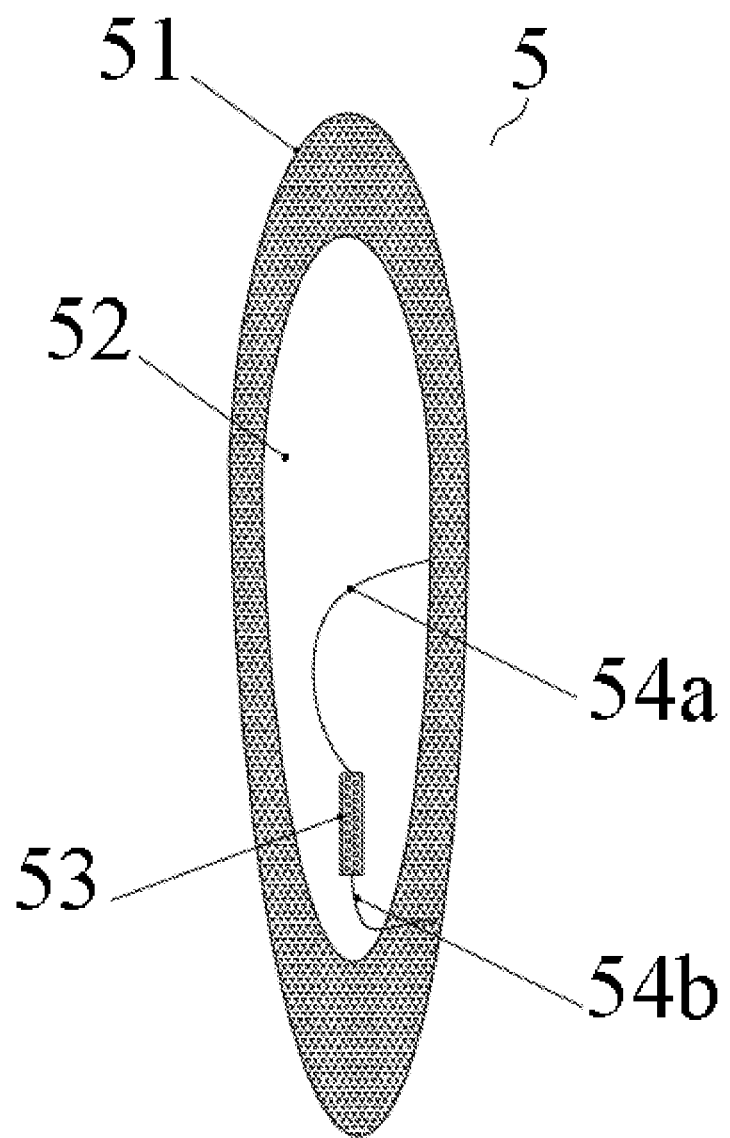
FIG. 4 is a schematic structural diagram of a water depth gauge in a large deformation underground energy storage device according to an embodiment of the disclosure.

As shown in FIG. 1, an embodiment of the disclosure provides a large deformation underground energy storage device, including a body, the body includes a rubber sealing layer 1, a negative Poisson's ratio material layer 2, a large deformation concrete layer 3 and rock layers sequentially nested from inside to outside. Specifically, the rubber sealing layer 1 is connected with the negative Poisson's ratio material layer 2 by nesting between layers, the negative Poisson's ratio material layer 2 is connected with the large deformation concrete layer 3 by nesting between layers, and the large deformation concrete layer 3 is connected with the rock layers by nesting between layers. The rubber sealing layer 1 is a rubber body with a sealing structure, which plays a scaling role and may bear a part of tensile force during deformation. The negative Poisson's ratio material layer 2 is composed of several negative Poisson's ratio material elements 21 connected in sequence. As shown in FIG. 3, the negative Poisson's ratio material elements 21 are concave hexagonal structures with negative Poisson's ratio material characteristics. Due to their own good material properties, the elements may not generate a large tensile stress in a circumferential direction during a large deformation process. The large deformation concrete layer 3 is cast from concrete that may support large deformation, such as high ductility concrete, which may bear large deformation and loads. The large deformation concrete layer 3 mainly bears a radial stress caused by an enlargement of a gas storage during the deformation. The rock layers are mainly composed of rock materials with characteristics of compression resistance and non-tension. When the rubber sealing layer 1, the negative Poisson's ratio material layer 2 and the large deformation concrete layer 3 all undergo large deformation, a stress transferred to the rock layers may be very small, especially the tensile stress. Thanks to the above structure of the embodiment of the disclosure, the energy storage device has a characteristic of large deformation, and through a design with large deformation, the energy storage device may weaken an original internal pressure according to a change of an internal gas pressure, thereby avoiding a gas leakage caused by destruction of the gas storage, and further storing more gas with greater pressure.

In the above structure, the rubber sealing layer mainly plays a role of sealing, and will bear a part of the tensile force during the deformation. A negative Poisson's ratio material benefits from its own good material properties, so the material may not produce a large tensile stress in the circumferential direction during the large deformation process. At this time, the tensile stress generated in the circumferential direction of the gas storage basically disappears due to the enlargement. The large deformation concrete layer mainly bears the radial stress caused by the enlargement of the gas storage during the deformation. When the rubber sealing layer, the negative Poisson's ratio material layer and the large deformation concrete layer all undergo large deformation, a stress transferred to a secondary rock layer may be very small, especially the tensile stress. Because the rock materials have the characteristics of compression resistance and non-tension, thanks to the structure of the embodiment of the disclosure, the gas storage may store more gas with greater pressure.

In an embodiment, the rock layers include a primary rock layer 4*a* connected with the large deformation concrete layer 3 and a secondary rock layer 4b located outside the primary rock layer 4a, and the primary rock layer 4a and the secondary rock layer 4b are paved with rock materials with different sizes, for example, the primary rock layer 4a mainly includes small-sized gravels, and the secondary rock layer 4b mainly includes large-sized rock blocks.

Because the gas may contain water molecules and be continuously compressed and released in the gas storage, water droplets will be formed after compression and fall in the gas storage. After a period of operation, the gas storage often contains more accumulated water. These accumulated water and water droplets will not only affect purity of the gas, but also may form miniature chemical batteries with the gas storage, thus corroding the gas storage.

Therefore, in a further optimization scheme, there is an annular conduit 10 between the primary rock layer 4a and the secondary rock layer 4b, and the primary rock layer 4a further contains multiple rigid gaskets 8, and the multiple rigid gaskets 8 are evenly spaced around a circumferential direction of the primary rock layer 4a for supporting the annular conduit 10. The annular conduit 10 penetrates into the body through a conduit 7 for discharging the accumulated water in the body, and the conduit 7 is connected with a one-way pressure pump 6, and the one-way pressure pump 6 forms a one-way conduction structure from the inside of the body to the annular conduit 10.

Figure 5:
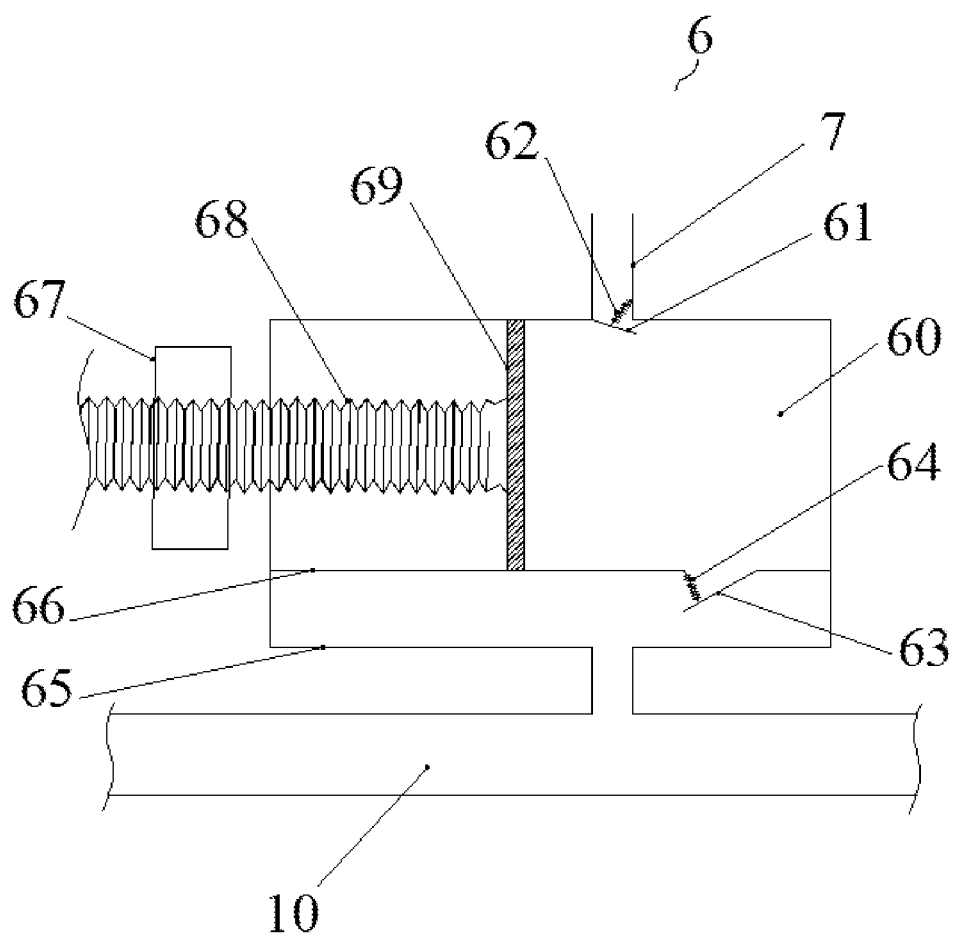
FIG. 5 is a schematic structural diagram of a one-way pressure pump in a large deformation underground energy storage device according to an embodiment of the disclosure.

In an embodiment, as shown in FIG. 5, the one-way pressure pump 6 includes a one-way pressure pump housing 65, and a one-way pressure pump cavity 60 is formed in the one-way pressure pump housing 65. One end of the one-way pressure pump cavity 60 is connected with the conduit 7, and an other end of the one-way pressure pump is connected with the annular conduit 10. A first one-way valve is arranged at a joint of the one-way pressure pump cavity 60 and the conduit 7. The first one-way valve includes a first sealing door 61 and a first spring 62, and the first sealing door 61 may be opened unidirectional towards the inside of the one-way pressure pump cavity 60. One side of the one-way pressure pump cavity 60 close to the annular conduit 10 is provided with a second one-way valve, and the one-way valve includes a second sealing door 63 and a second spring 64. A piston in the one-way pressure pump cavity 60 is connected with a piston rubber body 69, and one side of the piston rubber body 69 is embedded on a threaded rod 68, and the threaded rod 68 is connected with a precession screw 67. The precession screw 67 rotates to drive the threaded rod 68 and the piston rubber body 69 to reciprocate along a length direction of the threaded rod 68, so as to realize actions of pumping negative pressure and pressurizing the one-way pressure pump cavity 60, and then the accumulated water in the body is pumped through the first one-way valve in a process of pumping negative pressure, and the accumulated water in the one-way pressure pump cavity 60 is discharged to the annular conduit 10 through the second one-way valve in a process of pressurizing.

Figure 6:
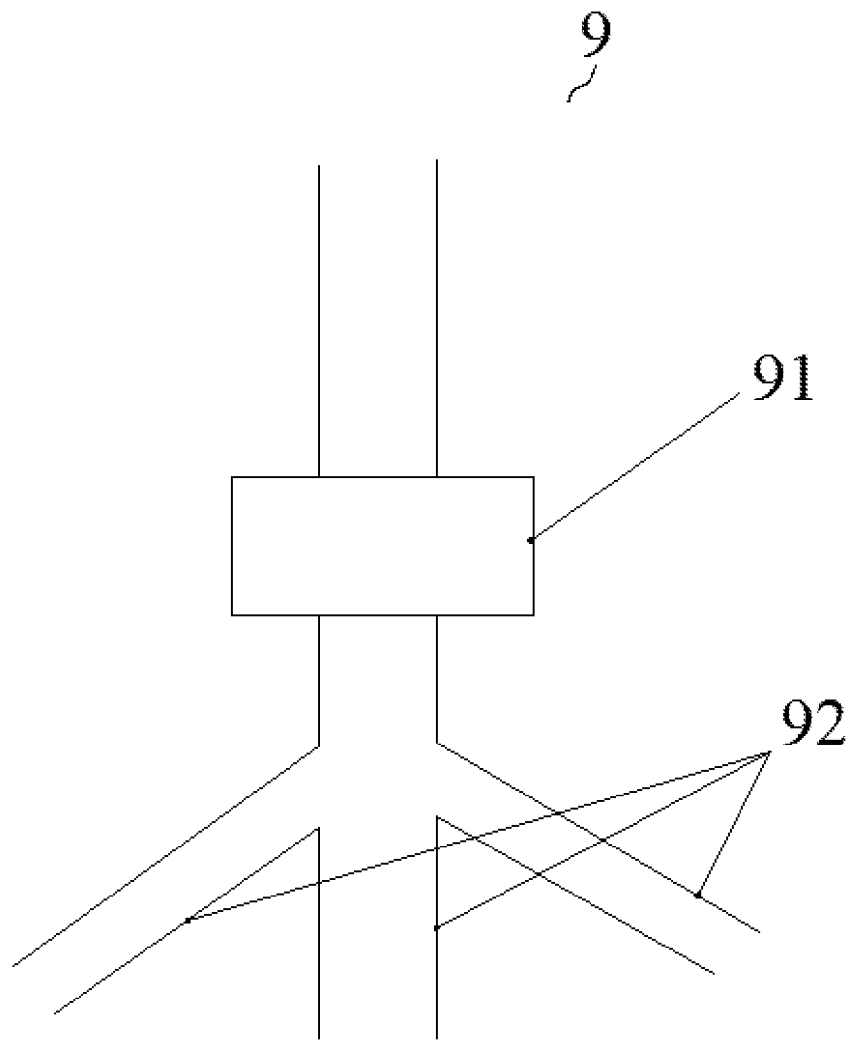
FIG. 6 is a schematic structural diagram of a three-way nozzle instrument in a large deformation underground energy storage device according to an embodiment of the disclosure.

In an embodiment, multiple three-way nozzle instruments 9 are distributed along a circumferential side on an outer ring side of the annular conduit 10. As shown in FIG. 6, each of the three-way nozzle instruments 9 includes a pressure switch 91 and three bifurcated nozzles 92, and the three nozzles 92 diverge at a certain angle for uniformly discharging the discharged accumulated water into the secondary rock layer 4b.

In an embodiment, a water depth gauge 5 is arranged inside the body, and the water depth gauge 5 includes a water depth gauge housing 51 and a water depth gauge cavity 52. A signal antenna 53 is fixed inside the water depth gauge cavity 52, and the signal antenna 53 is connected to an inner surface and an outer surface of the water depth gauge 5 through two wires. A first wire 54a is connected to an inner surface of the water depth gauge housing 51, and a second wire 54b is connected to an outer surface of the water depth gauge housing 51. The water depth gauge housing 51 is made of a special material, such as a piezoelectric material, which may generate electrons that move freely when subjected to a pressure, thereby forming a potential difference under the pressure. A current flows from the inner surface of the water depth gauge housing 51 along the wires to the signal antenna 53, and then to the outer surface of the water depth gauge housing 51. Both sides of the water depth gauge housing 51 are oval, and one side is larger and an other side is smaller. When there is more accumulated water in the body, the water depth gauge 5 will float under buoyancy, and a larger side is above the water and a smaller side is under the water. The signal antenna 53 is in signal connection with the precession screw 67. The signal antenna 53 does not emit signals when it is horizontal or has a small angle with a horizontal plane, but only emits signals when it is vertical or inclined. The precession screw 67 starts to rotate after receiving a signal transmitted by the signal antenna 53. At this time, the piston rubber body 69 and the threaded rod 68 move backward, and the accumulated water flows into the one-way pressure pump cavity 60 from the conduit 7. Then, the precession screw 67 rotates in an opposite direction, and the piston rubber body 69 and the threaded rod 68 move forward, and the accumulated water is squeezed into the annular conduit 10 from the one-way pressure pump cavity 60.

In an embodiment, a length of one side of each of the rigid gaskets 8 close to the annular conduit 10 is longer than the other side, which is beneficial to better supporting the annular conduit 10.

In an embodiment, the piston rubber body 69 should have a characteristic of preventing an air leakage, and may be a polymer material with low permeability such as butyl rubber, natural rubber, ethylene propylene diene monomer or glass fiber reinforced plastic.

In an embodiment, upper surface and lower surface of each of the first sealing door 61 and the second sealing door 63 are both embedded with anti-corrosion and low permeability materials. When the one-way pressure pump 6 does not work, the gas inside the device may not leak through the sealing doors.

In an embodiment, one side of the one-way pressure pump housing 65 close to the annular conduit 10 is provided with a sealing steel sheet 66, and the sealing steel sheet 66 and the one-way pressure pump housing 65 above it form the one-way pressure pump cavity 60. This cavity structure not only has a capacity of storing water, but also prevents backflow caused by excessive water in the annular conduit 10.

In an embodiment, the pressure switch 91 may detect both a water pressure state in the annular conduit 10 and a pressure state at the nozzles 92.

A working principle of the embodiment of the disclosure is as follows.

When gas is compressed by a compressor, the gas will be stored in the gas storage. Due to a high pressure of the gas after compression, the rubber sealing layer, the negative Poisson's ratio material layer and the large deformation concrete layer will undergo large deformation, and an internal pressure of the gas storage will be reduced after the large deformation. In this process, the rubber sealing layer bears a part of tensile force during the deformation, and the negative Poisson's ratio material layer will not produce a large tensile stress in a circumferential direction during the large deformation based on its own material characteristics. At this time, the tensile stress generated in the circumferential direction of the gas storage will basically disappear due to an enlargement. The large deformation concrete layer bears a radial stress caused by the enlargement of the gas storage during the deformation. When the rubber sealing layer, the negative Poisson's ratio material layer and the large deformation concrete layer all undergo large deformation, a stress transferred to the secondary rock layer will be very small, especially the tensile stress. Because the rock materials have characteristics of compression resistance and non-tension, thanks to the structure of the embodiment of the disclosure, the gas storage may store more gas with greater pressure. Because the gas may contain water molecules and be continuously compressed and released in the gas storage, the gas storage often contains more accumulated water after running for a period of time. When there is more accumulated water in the gas storage, the water depth gauge will float under buoyancy, and at this time, the larger side is above the water and the other side is under the water. When the gas is stored in the gas storage, the gas will squeeze the water depth gauge housing, and the water depth gauge housing will form a potential difference under an action of pressure. A current flows from the inner surface of the water depth gauge housing along the wires to the signal antenna, and then to the outer surface of the water depth gauge housing. The signal antenna first detects that there is a large angle between itself and a horizontal plane, and then starts to transmit signals to the precession screw. The precession screw starts to rotate after receiving a signal transmitted by the signal antenna. At this time, the piston rubber body and the threaded rod move backward, and the accumulated water flows into the one-way pressure pump cavity from the conduit. Then, the precession screw rotates in an opposite direction, the piston rubber body and the threaded rod move forward, and the accumulated water is squeezed into the annular conduit from the one-way pressure pump cavity. The pressure switch monitors water pressures at the annular conduit and the nozzles in real time. When a pressure difference between the annular conduit and the nozzles is detected to be large, the pressure switch is turned on automatically, and the accumulated water flows out from the nozzles under an action of the pressure difference which may also play a role of water seal for the gas storage.

The embodiment of the disclosure has advantages that the device may store a large amount of energy underground and realize high-density energy storage. Secondly, through a large deformation design, the device may weaken the original internal pressure according to the change of the internal gas pressure, thus avoiding the gas leakage caused by the destruction of the gas storage. An autonomous water seal technology ensures that the device remains efficient and safe in a process of long-term energy storage, and reduces energy waste. Based on the above structural features, the underground energy storage device of this embodiment may provide a reliable energy storage solution under a condition of limited utilization of underground space.

Details of the disclosure are conventional technical means known to those skilled in the art. In a description of the disclosure, it should be understood that terms "vertical", "horizontal", "up", "down", "front", "back", "left", "right", "vertical", "horizontal", "top", "bottom", "inside", "outside", and other indications of orientation or positional relationships are based on orientation or positional relationships shown in accompanying drawings, solely for a convenience of describing the disclosure, rather than indicating or implying that a device or a component referred to must have a specific orientation, be constructed and operated in a specific orientation, therefore it may not be understood as a limitation of the disclosure.

The above-mentioned embodiments only describe preferred modes of the disclosure, and do not limit a scope of the disclosure. Under a premise of not departing from a design spirit of the disclosure, various modifications and improvements made by ordinary technicians in the field to the technical scheme of the disclosure shall fall within a protection scope determined by claims of the disclosure.

What is claimed is:

1. A large deformation underground energy storage device, comprising a body, wherein the body comprises a rubber sealing layer, a negative Poisson's ratio material layer, a large deformation concrete layer and rock layers sequentially nested from inside to outside; an internal storage space is formed in the rubber sealing layer, the negative Poisson's ratio material layer comprises a plurality of negative Poisson's ratio material elements connected in sequence, and the large deformation concrete layer is cast from deformable concrete.

2. The large deformation underground energy storage device according to claim 1, wherein the rock layers comprise a primary rock layer connected with the large deformation concrete layer and a secondary rock layer located outside the primary rock layer.

3. The large deformation underground energy storage device according to claim 2, wherein an annular conduit is nested between the primary rock layer and the secondary rock layer, and the annular conduit is communicated into the rubber sealing layer through a conduit, and a one-way pressure pump is arranged in a middle part of the conduit.

4. The large deformation underground energy storage device according to claim 3, wherein the one-way pressure pump comprises a one-way pressure pump housing, and a one-way pressure pump cavity is formed in the one-way pressure pump housing; one end of the one-way pressure pump cavity is connected with the conduit, and an other end of the one-way pressure pump cavity is connected with the annular conduit; a first one-way valve is arranged at a position of the one-way pressure pump cavity being connected with the conduit, and a second one-way valve is arranged on one side of a position of the one-way pressure pump cavity being connected with the annular conduit, and a piston rubber body is movably connected in the one-way pressure pump cavity.

5. The large deformation underground energy storage device according to claim 4, wherein the piston rubber body is connected with a precession screw through a threaded rod.

6. The large deformation underground energy storage device according to claim 3, further comprising a water depth gauge inside the rubber sealing layer, wherein the water depth gauge comprises a water depth gauge housing and a water depth gauge cavity; a signal antenna is fixed inside the water depth gauge cavity, and two ends of the signal antenna are respectively connected to an inner surface and an outer surface of the water depth gauge housing through wires, and the water depth gauge housing is made of a piezoelectric material.

7. The large deformation underground energy storage device according to claim 6, wherein two sides of the water depth gauge housing are oval, and an outline dimension of one side is larger than that of an other side.

8. The large deformation underground energy storage device according to claim 3, wherein a plurality of rigid gaskets for supporting the annular conduit are arranged in the primary rock layer, and the plurality of rigid gaskets are uniformly distributed along an inner circumferential direction of the annular conduit.

9. The large deformation underground energy storage device according to claim 8, wherein a length of one side of each of the rigid gaskets close to the annular conduit is longer than a length of an other side close to the large deformation concrete layer.

10. The large deformation underground energy storage device according to claim 9, wherein a plurality of three-way nozzle instruments are distributed along a peripheral side of the annular conduit; each of the three-way nozzle instruments comprises a pressure switch and three bifurcated nozzles, and the nozzles are used for uniformly discharging accumulated water in the annular conduit into the secondary rock layer.

* * * * *